United States Patent
Wu et al.

(10) Patent No.: US 6,441,948 B1
(45) Date of Patent: Aug. 27, 2002

(54) TANDEM OPTICAL FREQUENCY MIXER

(75) Inventors: Sheng Wu; Geoffrey Blake, both of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/481,719

(22) Filed: Jan. 12, 2000

Related U.S. Application Data

(60) Provisional application No. 60/115,616, filed on Jan. 12, 1999.

(51) Int. Cl.⁷ .................................................. G02F 1/35
(52) U.S. Cl. ........................................ 359/326; 359/328
(58) Field of Search .................................. 359/326–332

(56) References Cited

U.S. PATENT DOCUMENTS 3,619,637 A * 11/1971 Goto .......................... 359/328
6,215,800 B1 * 4/2001 Komine ..................... 359/330

* cited by examiner

*Primary Examiner*—John D. Lee
(74) *Attorney, Agent, or Firm*—Fish & Richardson P.C.

(57) ABSTRACT

A crystal used for non-linear conversion of optical frequencies. Heating in the crystal can cause effects on the angle matching. A number of multiple crystals are used, with the first crystal forming a partial conversion, and subsequent crystals compensating for the heating effect in the first crystals.

22 Claims, 2 Drawing Sheets

US 6,441,948 B1

TANDEM OPTICAL FREQUENCY MIXER

CROSS-REFERENCE TO RELATED APPLICATIONS

This application claims benefit of U.S. Provisional application No. 60/115,616, filed Jan. 12, 1999.

FIELD

The present invention relates to non-linear optical frequency conversion systems, and in particular to the design of optical frequency mixers.

BACKGROUND

Non-linear optical crystals have been used for optical frequency mixing. FIG. 1 shows two laser frequencies $\omega_1$, $\omega_2$ passing through a nonlinear optical ("NLO") crystal 100. The non-linear effect of the medium synthesizes a laser beam with a third frequency, $\omega_3$ where $\omega_3 = \omega_1 \pm \omega_2$.

This nonlinear process is enhanced when the refractive index of the crystal is properly matched. This is called the phase matching condition. This proper match can be controlled by angle tuning of the crystal orientation with respect to the three laser beams $\omega_1$, $\omega_2$ and $\omega_3$. Phase matching can also be carried out by changing the temperature, or by applying a difference electric field, etc.

An optical frequency mixer which has $\omega_1 = n^*\omega$, $\omega_2 = m^*\omega$, and $\omega_3 = (n+m)\omega$, where n,m are integers are greater than 0, is called a harmonic generator.

One example uses the fundamental of the Nd:YAG laser 1064 nm ($\omega_1$), the second harmonic at 532 nm (green, $\omega_{532} = \omega_{1064} + \omega_{1064}$), and the fourth harmonic at 266 nm (Ultra-Violet, UV, $\omega_{266} = \omega_{532} + \omega_{532}$).

Optical frequency mixers allow a single laser source to be used for multiple different operations. For example, the fundamental output of a Nd:YAG laser is at 1064 nm. This frequency is not properly tuned to drill though many metals and plastics effectively. The fourth harmonic of 1064 nm, at 266 nm, however, allows the laser pulses to drill smooth holes with great ease in these materials.

Harmonics of lasers can also be used to pump tunable lasers, and enables covering a much broader spectral range. Optical frequency mixing research often attempts to generate higher power harmonics of solid state lasers such as Nd:YAG lasers in the deep UV range, e.g. <300 nm down to 190 nm. These deep UV sources are also used for microlithography. Deep UV sources permit small features e.g. 0.1 μm to be formed. Deep UV sources are also used for many industrial and scientific applications including inkjet nozzle drilling, laser eye surgery, trace gas monitoring and dissociation and others.

Although gas lasers could be used to generate a high power UV source, their size and the power consumed can be less favorable than current solid state lasers.

BRIEF DESCRIPTION OF THE DRAWING

These and other aspects will be described with reference to the accompanying drawings, wherein.

DETAILED DESCRIPTION

An obstacle to efficient generation of deep UV using an optical frequency mixer is caused by so-called "thermally-induced phase mismatch". All crystals begin to have absorption properties-at deep UV wavelengths. This absorption can be enough to generate a temperature gradient that will effectively change the refractive index of the nonlinear optical crystal. The change of the refractive index can alter the phase matching. This causes a phase mismatch gradient inside the crystal.

Figure 2:
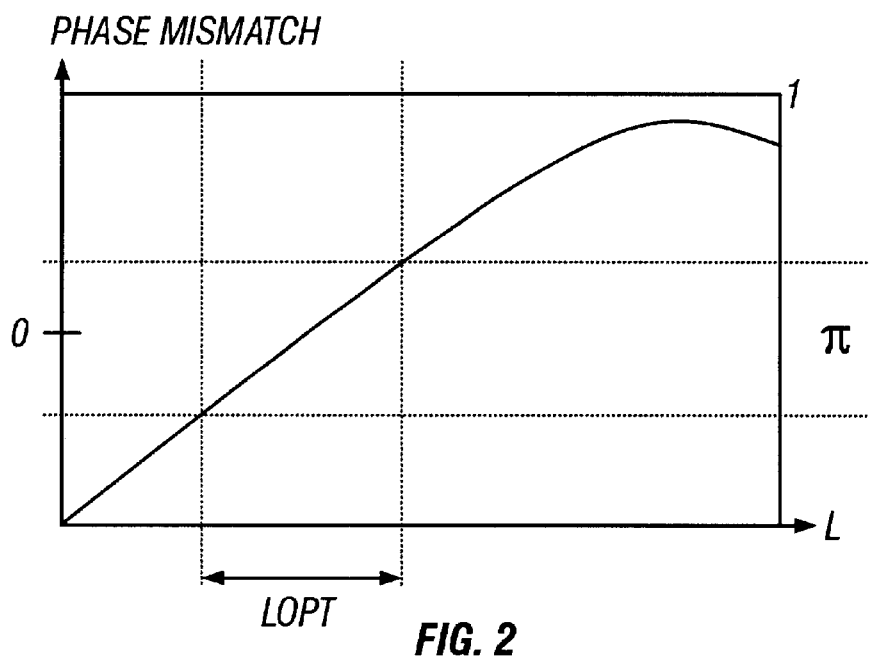
FIG. 2 shows an example of the phase mismatch gradient inside a nonlinear optical crystal whose length is not optimized for repeatable high power optical frequency mixing operation.
Figure 3:
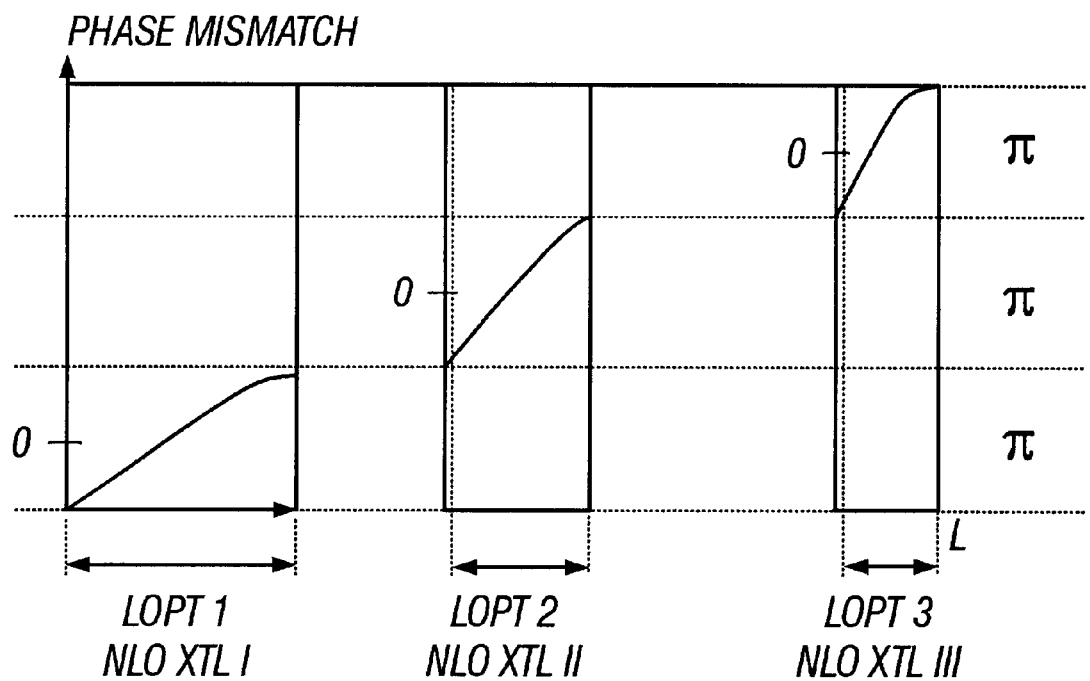
FIG. 3 is an example of the phase mismatch gradient inside the tandem series of nonlinear optical crystals.

FIG. 2 illustrates a phase mismatch gradient in a crystal. Obviously, the phase mismatch gradient is the larger than π. This can degrade the efficiency at high power, impose a limit on the converted power and degrade the stability and beam profile as well.

This mismatch changes the effective length (Lopt) of the nonlinear optical crystal. As long as the phase mismatch stays within the value π, surrounding and encompassing phase mismatch, $\omega_3$ can be produced. However, the temperature change induced by the conversion can increase the phase mismatch to beyond π and thus limits the efficiency of the nonlinear process. "Alleviation of thermally induced phase mismatch in $CsLiB_6O_{10}$ crystal by means of temperature-profile compensation", by Yap et al. Optics Letters, v23 (13): pp1016–1018 (Jul. 1, 1998), proposed external cooling for compensating this temperature gradient. An external jet of air could be sprayed at the end of the nonlinear optical crystal. This scheme, however, required a source of pressurized possible constant pressurized air during operation. "High Average Power Harmonic Generation", by David Eimerl, IEEE, J. Quantum Elec. Vol. 23, 575–592, (1987) proposed separating a thicker crystal into several thinner pieces. A cooling gas was caused to flow in between each piece.

However, the present inventor found that the second solution only considered homogenous heating of the crystal, i.e. the absorption of the input and output photons. The inhomogeneous absorption inside the nonlinear optical crystal β-BBO, and the temperature gradient created by such inhomogeneous absorption, can be highly asymmetric and can have a much larger temperature gradient than homogenous absorption.

The inventors found that "thermally induced phase mismatch" can also be a problem in generating the optical frequency in the other frequency ranges, e.g. the mid Infra-Red wavelength region. In this region, absorption by non-linear crystals is even stronger, and therefore the thermal management inside the crystals can be addressed as well.

The optical frequency mixer of the present invention operates to remove the temperature gradient limit on crystal length. This improves the nonlinear interaction length and hence the conversion efficiency. An all solid-state system is optimized for nonlinear optical crystals. It increases the effective length of the nonlinear optical crystal and therefore improves the optical frequency mixer's efficiency, repeatability and stability.

The characteristic phase mismatch is the value within which the crystal can continue to produce $\omega_3$ in a nonlinear optical crystal whose length is not optimized for repeatable high power generation of $\omega_3$ (FIG. 2), the phase mismatch gradient inside the crystal can span a much larger value than the π. Asymmetric absorption can cause the thermally induced phase mismatch to be asymmetric. The phase mismatch as shown has its minimum value at the crystal input surface and its manximum value at the crystal output surface.

Within the π phase mismatch, the nonlinear optical crystal can efficiently generate the $\omega_3$ frequency. Outside the π phase mismatch, the nonlinear crystal reverses the generation process of $\omega_3$. This reduces the efficiency of this nonlinear optical frequency mixer.

When the laser is turned off, the nonlinear optical crystal eventually cools to ambient temperature. However, the crystal's relative angle position or ambient temperature remains the same. The phase mismatch in this case can become larger than π. Thereafter, when the laser is turned back on, the power of $\omega_3$ will be lowered as the phase mismatch inside the crystal remains larger than π. This can prevent the crystal from regaining the efficiency it had reached before the laser was turned off.

In the prior art, a single piece of nonlinear optical crystal is used whose length is optimized for repeatable power generation of $\omega_3$. The phase mismatch gradient inside the crystal has a value less than the characteristic phase mismatch π. Therefore, the entirety of the crystal length is optimized for generation of $\omega_3$.

At higher levels of power generation of $\omega_3$, which the crystal's absorption becomes stronger. The slope of the phase mismatch becomes very steep. This makes the length Lopt of the optimized nonlinear optical crystal become shorter. The shorter nonlinear optical crystal lowers the conversion efficiency. Therefore, the higher power $\omega_3$ has caused a lower conversion efficiency.

Figure 1:
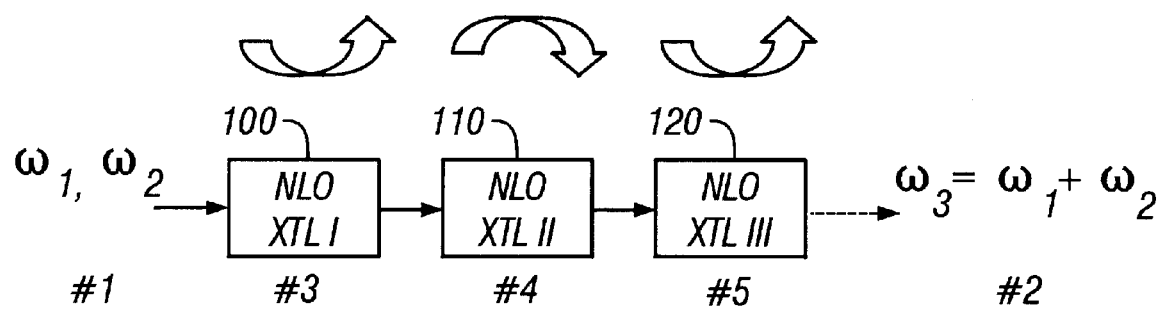
FIG. 1 is a diagrammatic view of the tandem optical frequency mixer.

The present application defines a new optical frequency mixer which uses additional crystals to avoid the above-described issues. FIG. 1 shows an embodiment where first crystal 100 is in series with second crystal 110 and third crystal 120. These crystals 100, 110, 120 are located in optical series with one another. The first crystal is optimized for $\omega_3$. The second crystal 110 is independently tuned for optimal frequency conversion, i.e. to compensate the phase mismatch created under the radiation of $\omega_3$ power generated from the first crystal. The length of the second crystal is also optimized, so the phase mismatch inside the crystal is also less than π.

Each crystal's thickness is reduced and at the same time each crystal is independently adjusted to compensate for thermally induced phase mismatch. In this way, the phase mismatch is always less than π in each crystal.

Under asymmetric absorption pattern inside nonlinear optical crystals, each crystal is independently adjusted to compensate for the thermally-induced phase mismatch.

A third crystal 120 can be used in a similar way for further efficiency improvement. Fourth and further crystals can further optimize the efficiency.

This optical frequency mixer design has been successfully characterized with a nonlinear optical crystal β-Barium Borate ("BBO") during the harmonic generation of 532 nm into 266 nm. An optical conversion efficiency of 23% and a total average power of 5.5 W have been achieved with a 2 piece BBO optical frequency mixer described above. Under similar conditions, the best conversion efficiency for past optical frequency mixer design with a single piece of BBO crystal is only 12% and 2.7 W. The repeatability and beam profile of the 266 nm harmonic are also greatly improved.

The second crystal 110 is preferably arranged in a counter rotating fashion relative to the first crystal 110, when adjusted for changing input frequencies. This compensates for the so-called walk-off effect in the first crystal 100. This counter rotating direction can also be applied to the subsequent third crystal 120 and any subsequent crystals. By arranging the crystals in this way, an optical frequency mixer can be used to produce tightly-focused laser beems where walk off could otherwise limit the laser.

Figure 4:
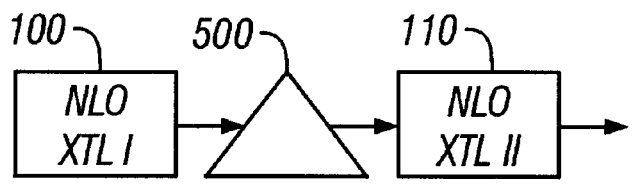
FIG. 4 shows an optical element between two optical crystals.

The methods for independent adjusting of the multiple crystals could include angle tuning. Crystals can be precut with different angles inside the crystals, or angle tuning can be carried out after cutting the crystal. FIG. 4 shows placing an optical element 500 between crystals 100, 110, to change the angle of incidence onto the next crystal. The independent adjusting could also be via temperature tuning of each crystal. Electrooptic tuning could be carried out by applying a certain voltage to each crystal.

The third frequency, $\omega_3$, could be any mix of any two different frequencies. For example, a third harmonic can be mixed with the second harmonic to generate the fifth harmonic. A mix of two lower energy photons can be carried out to generate a more energetic photon. A mix of two energetic photons can be carried out to generate the third less energetic photon.

The optical element 500 can be a wedge, a waveplate, lens and other optics. These can compensate for other aberrations, such as thermal lensing and depolarization, etc.

What is claimed is:

1. An optical frequency mixer, comprising:

a first nonlinear optical crystal, coupled to receive first and second optical inputs and having an optical rotation axis; and at least one additional nonlinear optical crystal, optically in series with said first optical crystal, and having an optical rotation axis forming a plane with the incoming optical inputs, said plane is substantially aligned with said optical rotation axis of said first nonlinear crystal, and said two crystals being configured to compensate for a thermal effect generated by said first and second optical inputs, and the generated output.

2. A mixer as in claim 1 wherein there is one additional nonlinear optical crystal.

3. A mixer as in claim 1 wherein said additional nonlinear crystals include a second crystal and a third crystal.

4. A mixer as in claim 1 wherein there are three additional nonlinear crystals.

5. A mixer as in claim 1 wherein an output of said at least one additional nonlinear crystal is ω3=ω1±ω2, where $\omega_1$ and $\omega_2$ are respectively frequencies of said first and second optical input.

6. A mixer as in claim 1 wherein said at least one of said crystals includes a second crystal which has a length which is optimized to minimize a phase mismatch relative to the first crystal.

7. A mixer as in claim 1 wherein said first crystal intersects said optical inputs by a first angle, and a second crystal intersects said optical inputs by a second angle different than said first angle, and where a difference between the said first angle and the second angle is to compensate for the thermally induced phase mismatch by the first and second optical inputs and the generated output.

8. A mixer as in claim 2 wherein said first crystal intersects said optical inputs by a first angle, and said additional non-linear crystal intersects said optical inputs by a second angle different than said first angle, and where a difference between the said first angle and the second angle is to compensate for the thermally induced phase mismatch by the first and second optical inputs and the generated output.

9. A mixer as in claim 3 wherein said first crystal intersects said optical inputs by a first angle, and said second crystal intersects said optical inputs by a second angle different than said first angle and said third crystal intersects said optical inputs by a third angle, and where a difference between said third angle and said first angle and said second angle is an amount to compensate for thermally induced mismatch by said first and second crystal.

10. A mixer as in claim 1 wherein said additional crystals are adjusted by angle tuning.

11. A mixer as in claim 10 wherein said tuning comprises angle tuning after cutting the crystal.

12. A mixer as in claim 10 further comprising an optical element in between two crystals to change an angle of incidence onto a next crystal.

13. A mixer as in claim 1 further comprising an element which temperature-tunes said crystals.

14. A mixer as in claim 1 wherein an output of said additional crystal is a mixture of said first and second optical inputs.

15. A mixer as in claim 1 wherein an output of said additional crystal is a mixture of harmonics of said first and second optical inputs.

16. A mixer as in claim 1 further comprising an optical element in between the crystals to compensate for other optical aberrations.

17. A mixer as in claim 1, wherein said first and second optical inputs are laser inputs.

18. An optical frequency mixer, comprising:

a first nonlinear optical crystal, coupled to receive first and second optical inputs and having an optical rotation axis; and at least one additional nonlinear optical crystal, optically in series with said first optical crystal, and having an optical rotation axis which is substantially aligned with an optical rotation axis of said first nonlinear crystal and configured to compensate for a thermal effect generated by said first and second optical inputs;

wherein said additional crystals are adjusted by angle tuning, and wherein said angle tuning includes a precut crystal with specified angles inside the crystal.

19. An optical frequency mixer, comprising:

a first nonlinear optical crystal, coupled to receive first and second optical inputs and having an optical rotation axis; and at least one additional nonlinear optical crystal, optically in series with said first optical crystal, and having an optical rotation axis which is substantially aligned with an optical rotation axis of said first nonlinear crystal and configured to compensate for a thermal effect generated by said first and second optical inputs;

wherein said additional crystals are adjusted by angle tuning and wherein said tuning comprises electro-optic tuning by applying a voltage application.

20. A method of optical frequency mixing, comprising:

applying first and second optical inputs to a first nonlinear optical crystal which produces a first output; and compensating for a thermal effect generated in said first non-linear optical crystal using at least one additional non-linear crystal;

adjusting said crystals by angle tuning; and wherein said angle tuning comprises forming a precut crystal with specified angles inside the crystal.

21. A method of optical frequency mixing, comprising:

applying first and second optical inputs to a first nonlinear optical crystal which produces a first output; and compensating for a thermal effect generated in said first non-linear optical crystal using at least one additional non-linear crystal;

adjusting said crystals by angle tuning; and wherein said tuning comprises angle tuning after cutting the crystal.

22. A method of optical frequency mixing, comprising:

applying first and second optical inputs to a first nonlinear optical crystal which produces a first output; and compensating for a thermal effect generated in said first non-linear optical crystal using at least one additional non-linear crystal;

adjusting said crystals by angle tuning; and wherein said adjusting comprises placing an optical element in between two crystals to change an angle of incidence onto a next crystal.

* * * * *